United States Patent
Hayward et al.

(10) Patent No.: US 10,526,467 B2
(45) Date of Patent: Jan. 7, 2020

(54) POROUS MATERIAL AND METHODS OF MAKING AND OF USING THE SAME

(71) Applicant: THE UNIVERSITY OF MASSACHUSETTS, Boston, MA (US)

(72) Inventors: Ryan Hayward, Northampton, MA (US); Di Zeng, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 133 days.

(21) Appl. No.: 15/450,120

(22) Filed: Mar. 6, 2017

(65) Prior Publication Data

US 2017/0260351 A1 Sep. 14, 2017

Related U.S. Application Data

(60) Provisional application No. 62/306,424, filed on Mar. 10, 2016.

(51) Int. Cl.
| | |
|---|---|
| *C08J 9/26* | (2006.01) |
| *C08J 9/28* | (2006.01) |
| *B01D 39/16* | (2006.01) |

(52) U.S. Cl.
CPC ............ *C08J 9/26* (2013.01); *B01D 39/1676* (2013.01); *C08J 9/28* (2013.01); *B01D 2239/1208* (2013.01); *C08J 2201/026* (2013.01); *C08J 2201/0462* (2013.01); *C08J 2201/0464* (2013.01); *C08J 2201/0522* (2013.01); *C08J 2205/042* (2013.01); *C08J 2205/044* (2013.01); *C08J 2325/06* (2013.01)

(58) Field of Classification Search
CPC ....... C08J 2201/046; C08J 9/26; C08G 18/62; C08G 18/4063; C08G 18/428
See application file for complete search history.

(56) References Cited

U.S. PATENT DOCUMENTS

| | | | | |
|---|---|---|---|---|
| 2002/0198277 A1* | 12/2002 | Sezi | ........................... | C08J 9/26 521/134 |
| 2004/0138406 A1* | 7/2004 | Halik | ..................... | C08G 69/26 528/183 |
| 2010/0292077 A1* | 11/2010 | Hillmyer | ............ | B01D 67/0006 502/402 |

OTHER PUBLICATIONS

Bryan W. Boudouris, C. Daniel Frisbie, and Marc A. Hillmyer. "Nanoporous Poly(3-alkylthiophene) Thin Films Generated from Block Copolymer Templates" Macromolecules 2008, 41, 67-75 (Year: 2008).*

Machine translation of JP 2009108209 by Takeda et al. (Year: 2009).*

Cui et al.; "Synthetically Simple, Highly Resilient Hydrogels"; Biomacromolecules 2012; 13; pp. 584-588.

(Continued)

*Primary Examiner* — Michael M Dollinger
*Assistant Examiner* — Christina H. W. Rosebach
(74) *Attorney, Agent, or Firm* — Cantor Colburn LLP

(57) ABSTRACT

In an embodiment, a porous material comprises a base polymer having a continuous pore structure. In another embodiment, a method of making the porous material comprises reacting a base polymer with a degradable polymer with a crosslinker in the presence of a solvent and/or reacting a base polymer and a degradable polymer with a crosslinker in the presence of the solvent; removing the solvent to form a phase separated material; and removing the degradable polymer to form the porous material.

16 Claims, 5 Drawing Sheets

(56) References Cited

OTHER PUBLICATIONS

Dinu et al.; "Porous Semi-Interpenetrating Hydrogel Networks Based on Dextran and Polyacrylamide With Superfast Respposiveness"; Macromolecular Chemistry and Physics; 2011; 212; pp. 240-251.

Erdodi et al.; "Amphiphilic conetworks: Definition, synthesis, applications"; Progress in Polymer Science 31; (2006); pp. 1-18.

Erdodi et al.; "Ideal Tetrafunctional Amphiphilic PEG/PDMS Conetworks by a Dual-Purpose Extender/Crosslinker. I. Synthesis"; Journal of Polymer Science Part A: Polymer Chemistry; vol. 43; pp. 4953-4964 (2005).

Erdodi et al.; "Novel Amphiphilic Conetworks Composed of Telechelic Poly)ethylene oxide) and Three-Arm Star Polyisobutylene"; Chem. Mater. 2004; 16; pp. 959-962.

Ivan et al.; "Synthesis, Characterization, and Structural Investigations of Poly(ethyl acrylate)-1-polyisobutylene Bicomponent Conetwork"; Macromolecules 2001; 34; pp. 1579-1565.

Jinnai et al.; "Direct Observation of Three-Dimensional Bicontinuous Structure Developed via Spinodal Decomposition"; Macromolecules 1995; 28; pp. 4782-4784.

Panyukov; et al; "Stress-Induced Ordering in Microphase-Separated Multicomponent Networks"; Macromolecules 1996; 29; pp. 8220-8230.

Price et al.; Bicontinuous Alkaline Fuel Cell Membranes from Strongly Self-Segregating Block Copolymers; Macromolecules 2013; 46; pp. 7332-7340.

Sakurai et al.; "Mechanism of Thermally Induced Morphological Reorganization and Lamellar Orientation from the Herringbone Structure in Cross-Linked Polystyrene-block-polybutadiene-block-polystyrene Triblock Copolymers"; Macromolecules 2003; 36; pp. 1930-1939.

Sakurai et al.; "Preferential Orientation of Lamellar Microdomains Induced by Uniaxial Stretching of Cross-Linked Polystyrene-block-polybutadiene-block-polystyrene Tribiock Copolymer"; Macromolecules 2001; 34; pp. 3672-3678.

Sophiea et al.; "Interpenetrating Polymer Networks as Energy-Absorbing Materials"; Progress in Rubber and Plastics Technology; 7(3); pp. 174-193; (1991).

Sperling et al.; The Current Status of Interpenetrating Polymer Networks; Polymers for Advanced Technologies; vol. 7; pp. 197-208; (1996).

Walker et al.; "Wide Bicontinuous Compositional Windows from Co-Networks Made with Telechelic Macromonomers"; ACS Nano; vol. 8; No. 12; pp. 12376-12385 (2014).

Walker et al;. "Tunable Networks from Thiolene Chemistry for Lithium Ion Conduction"; ACS Macro Letters 2012; 1; pp. 737-741.

\* cited by examiner

POROUS MATERIAL AND METHODS OF MAKING AND OF USING THE SAME

CROSS-REFERENCE TO RELATED APPLICATION

This application claims the benefit of U.S. Provisional Patent Application Ser. No. 62/306,424 filed Mar. 10, 2016. The related application is incorporated herein in its entirety by reference.

BACKGROUND

Interconnected nanoporous polymeric materials are important in a variety of applications including catalysis and filtration, where the formation of a continuous pore structure is often beneficial. While several methods of preparing such nanoporous polymeric materials have been developed, they suffer from various synthetic limitations. For example, methods utilizing diblock copolymers suffer from issues relating to formation only over a very narrow range of polymer composition, for example, of about 5 volume percent (vol %), requiring precisely controlled synthesis and processing conditions. Likewise, methods utilizing polymerization induced phase separation suffer from a morphology that is kinetically trapped during polymerization requiring a fine control of the competition between the rates of phase separation and polymerization to obtain the desired structure.

An improved porous material having a continuous pore structure and a method of making such a material is therefore desired. An anisotropic porous material and a method of making such a material would further be desirable.

BRIEF SUMMARY

Disclosed herein is a porous material and methods of making and of using the same.

In an embodiment, a method of making a porous material, comprises reacting an endgroup of a base polymer and an endgroup of a degradable polymer with a reactive group of a crosslinker in the presence of a solvent; removing the solvent to form a phase separated material; and removing the degradable polymer to form the porous material.

In another embodiment, a method of making a porous material, comprises reacting an endgroup of a base polymer with an endgroup of a degradable polymer in the presence of a solvent; removing the solvent to form a phase separated material; and removing the degradable polymer to form the porous material.

In an embodiment, a porous material comprises a base polymer having a continuous pore structure.

In another embodiment, an article comprises the porous material.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Randomly end-linked copolymer networks can be formed by reaction of a telechelic polymer with a multi-functional crosslinker in a solvent. When the polymer comprises two or more immiscible polymers, a phase separated material can be formed. It was surprisingly found that when one of the phases of the phase separated material comprises a degradable polymer, a porous material having a continuous pore structure could be formed by removing the degradable polymer. The porous material can be formed by reacting a base polymer and a degradable polymer, optionally with a crosslinker in the presence of a solvent; removing the solvent to form a phase separated material; and removing the degradable polymer to form the porous material having a continuous pore structure. Such a method of forming the porous material was non-obvious as one of skill in the art would not have considered that a complete or near complete removal of the biodegradable polymer could have been achieved to result in the formation of the continuous pore structure. As used herein, the term "degradable polymer" refers to the fact that the polymer can be removed from the phase separated material and not necessarily that its polymer backbone is degraded upon removal.

Figure 1:
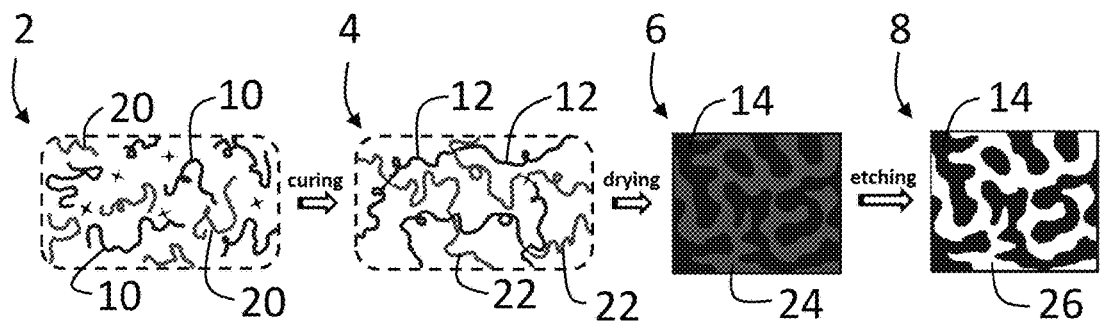
FIG. 1 is an illustration of an embodiment of a method of forming the porous material.

FIG. 1 illustrates a method of preparing the porous material. FIG. 1 illustrates that mixture 2 can be prepared comprising base polymer 10, degradable polymer 20, and a crosslinker denoted by the crosses to illustrate a tetrafunctional crosslinker. Mixture 2 can be cured to form crosslinked composition 4 where the endgroups of base polymer 10 and degradable polymer 20 have reacted with the crosslinker. Drying crosslinked composition 4 results in phase separated material 6 comprising base polymer phase 14 and degradable phase 24. Degradable phase 24 can then be removed, for example, by etching to form porous material 8 comprising base polymer phase 14 having a continuous pore structure 26.

The method of forming the porous material comprises reacting a base polymer with a degradable polymer, or reacting a base polymer and a degradable polymer with a crosslinker. Accordingly, the base polymer and the degradable polymer can have endgroups that react with each other and/or with a reactive group of the crosslinker. The base polymer and the degradable polymer can have the same or different endgroups. One or both of the base polymer and the degradable polymer can be endcapped to provide a desired endgroup. The endgroups of the base polymer and the degradable polymer and the reactive groups of the crosslinker, if present, can be selected such that they will react with each other, for example, to form covalent bonds. Accordingly, any suitable chemistry to react the endgroups and the reactive groups can be used. Likewise, the endgroups of the base polymer and the endgroups of the degradable polymer can be selected such that they react with each other, for example, without use of the crosslinker. The base polymer and the degradable polymer can each independently comprise an endgroup comprising a hydroxyl group, an isocyanate group, a primary amine group, a carboxyl group, a thiol group, a halide group, a silane group, an epoxy group, a halide group, a vinyl group, a norbornene group, an aldehyde group, an azide group, an alkyne group, an ester group (such as an activated ester group), an acrylate group, a methacrylate group, and the like, or a combination comprising at least one of the foregoing.

The crosslinker, if present, can comprise a multi-functional crosslinker, for example, comprising greater than or equal to 3, or greater than or equal to 4, or 3 to 6, or 3 to 4 reactive groups that can react with the endgroups of the base polymer and the degradable polymer. The crosslinker can comprise multiple reactive groups that are all the same. Conversely, the crosslinker can comprise different reactive groups such that one or more of the reactive groups can react with the base polymer, and one or more of the reactive groups can react with the degradable polymer. For example, the crosslinker can comprise two or more of a first reactive group and two or more of a second reactive group per crosslinker. Likewise, the crosslinker can comprise a first crosslinker comprising one or more of a first reactive group and two or more of a second reactive group and a second crosslinker comprising two or more of the first reactive group and one or more of the second reactive group. Using this strategy, the reactive group that selectively reacts with the degradable polymer can be degraded during the removing of the degradable polymer and the degradable polymer can be dissolved and removed without depolymerizing the polymer. The intact degradable polymer can then be used in the formation of a subsequent porous material.

The reactive groups can comprise a hydroxyl group, an isocyanate group, a primary amine group, a carboxyl group, a thiol group, a halide group, a silane group, an epoxy group, a halide group, a vinyl group, a norbornene group, an aldehyde group, an azide group, an alkyne group, an ester group (such as an activated ester group, an acrylate group, a methacrylate group, and the like, or a combination comprising at least one of the foregoing. Examples of crosslinkers are boric acid, pentaerythritol propoxylate, tetraisocyanatosilane, 1,3,5-triallyl-1,3,5-triazine, trimethylolpropane ethoxylate, glycerol ethoxylate, trivinyl benzene, trimellitic trichloride, pentaerythritol tetrakis(3-mercaptopropionate), toluene-2,4,6-triyl triisocyanate, triisocyanato-methyl-silane, tris-p-hydroxy phenyl ethane, and the like.

The crosslinking can occur via urethane chemistry, for example, the endgroups of one of the base polymer and the degradable polymer can comprise hydroxyl groups and the endgroups of the other of the base polymer and the degradable polymer can comprise isocyanate groups. Likewise, one of the reactive groups of the crosslinker and the endgroups of the polymers can comprise a hydroxyl group and the other can comprise an isocyanate group. For example, the crosslinker can comprise isocyanate reactive groups (for example, the crosslinker can comprise tetraisocyanatosilane) and both the base polymer and the degradable polymer can comprise hydroxyl endgroups. A ratio of the isocyanate groups to the hydroxyl groups can be greater than 1, or 1.1 to 2, or 1.3 to 1.6. In other embodiments, the crosslinking can occur by reacting a thiol group with a norbornene group, reacting a silane group with a vinyl group, reacting an epoxy group with an amine group, reacting a hydroxyl group with a halide group, reacting a hydroxyl group with a carboxyl group, and the like.

The base polymer and the degradable polymer can each independently be telechelic, for example, to allow for the polymers to have the same endgroups. The telechelic polymers can be prepared from a bifunctional initiation monomer or two polymer chains can be reacted with a difunctional linking group, for example, to link two polymer chains after their polymerization. In a specific example, the degradable polymer can comprise a telechelic poly(lactic acid) having hydroxyl endgroups, the base polymer can comprise a telechelic hydroxyl endcapped polystyrene, and the crosslinker can comprise tetraisocyanatosilane. Such a reaction mixture is shown below in Formula I, where $R_1$ and $R_2$ are difunctional groups (for example, that are derived from a difunctional initiator or a difunctional linking group) used in formation of the telechelic poly(lactic acid) and the telechelic polystyrene, respectively. For example, $R_1$ can comprise —$CH_2$—$CH_2$—O—$CH_2$—$CH_2$— that is derived from a difunctional initiator and $R_2$ can be derived from a difunctional initiator such as bisbromoisobutyryloxyethane.

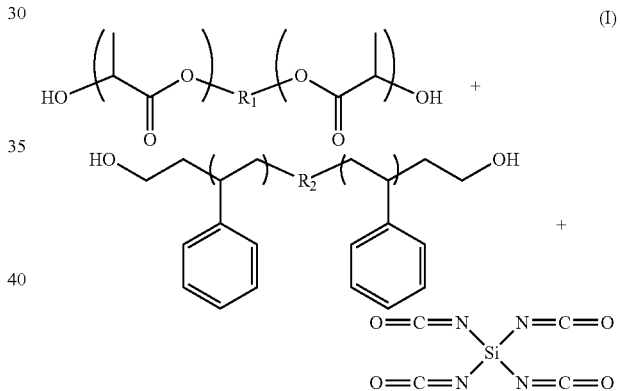

(I)

The solvent can comprise any solvent that effectively solvates the base polymer, the degradable polymer, and the crosslinker if present. For example, the solvent can comprise tetrahydrofuran, chloroform, dioxane, diethyl ether, diaryl ether, 2-butanone, 2-pentanone, hexanone, 2-heptanone, 2-octanone, propyl ether, butyl ether, furan, ethyl acetate, propyl acetate, butyl acetate, dimethyl acetamide, dimethyl formamide, and the like, or a combination comprising at least one of the foregoing.

After the crosslinking, the solvent can be removed, for example, by drying to form the phase separated material. The drying can comprise heating. The drying can be performed in an inert environment, for example, under nitrogen, argon, or a combination comprising at least one of the foregoing. After the solvent is removed, the phase separated material can be swollen to remove any uncrosslinked polymer or crosslinker. The phase separated material can be swollen in the same or different solvent. After the swelling, the phase separated material can be dried, for example, by heating to remove the solvent and/or in an inert environment.

In order to form the porous material, the degradable polymer in the phase separated material can then be removed, for example, the degradable polymer can be degraded or dissolved. The degrading can comprise introducing the porous material to one or more of a degradation agent, an increased temperature (for example, above a degradation temperature of the degradable polymer but below a degradation temperature of the base polymer), a light such as an ultraviolet light (for example, if the degradable polymer comprises a photodegradable segment), or a combination comprising one or more of the foregoing. The degradation agent can be selected such that the degradation agent degrades the degradable polymer but leaves the base polymer intact. The degradation agent can comprise a solvent such as water, an acid (such as hydrochloric acid, phosphoric acid, and the like), a base (for example, sodium hydroxide, lithium hydroxide, potassium hydroxide, and the like), an alcohol (such as methanol, ethanol, propanol, butanol, and the like), a microorganism, or a combination comprising at least one of the foregoing. For example, the degradation agent can comprise a 1 to 5 molar (M) basic solution.

Conversely, the degradable polymer can be removed by dissolving. For example, a linking group linking the degradable polymer to the base polymer can be selectively degraded (for example, by hydrolyzing or photodegrading the linking group), the degradable polymer can be dissolved in a solvent, and the dissolved degradable polymer can be removed to form the porous material. The removed degradable polymer can then be reused in the formation of a further porous material.

The resultant porous material can have a continuous pore structure. As used herein, a continuous pore structure refers to greater than or equal to 90 vol %, or 95 to 100 vol % of the pores being interconnected based on a total volume of the pore structure. Confirmation of a continuous pore structure can be performed by one or more of gravimetric analysis, Fourier transform infrared spectroscopy (FTIR), and differential scanning calorimetry (DSC) to confirm the amount of the degradable polymer remaining in the porous material. For example, if no degradable polymer is detected, then it can be confirmed that the degradable polymer had a continuous phase structure as all of the degradable polymer would have been removed during the degradation through its resultant continuous pore structure. In other words, if some of the degradable polymer was present in a closed cell encapsulated by the base polymer, then it would not be able to be removed during the degrading.

An average width of the continuous pore structure can be 5 to 200 nanometers (nm), or 10 to 150 nm, or 20 to 100 nm. The average width can be determined by small angle x-ray scattering (SAXS).

An anisotropic porous material can be formed by stretching the phase separated material above the glass transition temperatures, $T_g$, of both of the base polymer and the degradable polymer, and then reducing the temperature, for example, by quenching, to a temperature below glass transition temperatures of the base polymer and the degradable polymer, for example, to room temperature (23 degrees Celsius (° C.)) to preserve the oriented structure. The stretching can comprise uniaxially stretching the phase separated material to a strain, $\varepsilon$, (the change in length divided by the original length of, $\Delta L/L$) of greater than 1, or 1.1 to 5, or 1.1 to 1.5. The anisotropic porous material can have a first elastic modulus in a first direction that is greater than a second elastic modulus in a second direction perpendicular to the first direction.

The base polymer and the degradable polymer can have a high driving force for segregation, for example, corresponding to a Flory-Huggins parameter ($\chi$) of 0.05 to 0.5, or 0.2 to 0.4 at 20° C. Both the base polymer and the degradable polymer can be linear polymers. One or both of the degradable polymer and the base polymer can have a number average molecular weight, $M_n$, of 2 to 100 kilodaltons (kDa), or 4 to 50 kDa based on polystyrene standards. One or both of the degradable polymer and the base polymer can have a weight average molecular weight, $M_w$, of 2 to 100 kDa, or 4 to 50 kDa based on polystyrene standards. The base polymer and the degradable polymer can have a weight average molecular weight ratio of 1:2 to 2:1, or 1:1.5 to 1.5:1, or 1:1.1 to 1.1:1. The base polymer and the degradable polymer can have a relative weight percent (wt %) of the degradable polymer of 40 to 75 wt % based on the total weight of the base polymer and the degradable polymer.

The base polymer can comprise one or both of a step group polymer and a chain growth polymer. For example, the base polymer can comprise a polyolefin, a polyester, a polyamide, a polyimide, a polycarbonate, a polysulfone, a polysiloxane, a polysulfone, poly(phenylene oxide), a polyacetal, a polyacrylamide, a polyarylene ether, a polybenzothiazole, a polybenzoxazole, a polybenzimidazole, a polyurea, a polyurethane, a vinyl polymer, a polyacrylate, a polyether, or a combination comprising at least one of the foregoing. The base polymer can comprise polyacrylonitrile, polybutadiene, polystyrene, poly(ether ether ketone), poly (ether ketone), poly(methyl methacrylate), polypropylene, polybutylene, polyethylene, polytetrafluoroethylene, polyvinylidene fluoride, polyvinylchloride, poly(ethylene oxide), poly(acrylic acid), poly(methacrylic acid), poly(ethylene glycol), poly(vinyl alcohol), and the like, or a combination comprising at least one of the foregoing.

The base polymer can experience essentially no degradation during the removing of the degradable polymer. For example, the porous material can retain greater than or equal to 95 wt %, or 99 to 100 wt % of the base polymer that was present in the phase separated material.

The degradable polymer can comprise any polymer that can be degraded. The degradable polymer can comprise a polyester, a polyamide, a polyether, a polyanhydride, a polycarbonate, a polyurethane, or a combination comprising at least one of the foregoing. The degradable polymer can be derived from glycolide, ε-caprolactone, δ-valerolactone, ε-caprolactam, δ-valerolactam, trimethylene carbonate, tetramethylene carbonate, 1,5-dioxepane-2-one, 1,4-dioxane-2-one (para-dioxanone), a cyclic anhydrides (such as oxepane-2,7-dione), or a combination comprising at least one of the foregoing. The degradable polymer can comprise poly(lactic acid) (such as poly(D,L-lactic acid) (PDLLA), poly(D-lactic acid), and poly(L-lactic acid)), poly(glycolic acid), polyhydroxybutyrate, a polysaccharide, poly-ε-caprolactone, poly-ε-caprolactam, polybutylene succinate, polybutylene succinate adipate, polyethylene succinate adipate, and the like, or a combination comprising at least one of the foregoing. The degradable polymer can comprise one or more of the foregoing.

The porous material can find use in a variety of fields. For example, the porous material can have use in catalysis, for example, as a support. The porous material can be used in a filter, for example, in liquid or in air filtration. The porous material can be used in applications to replace high stiffness, lightweight materials such as balsa wood. The porous material can be used in a propeller of a wind turbine.

The following examples are provided to illustrate the porous article and methods of making the same. The examples are merely illustrative and are not intended to limit devices made in accordance with the disclosure to the materials, conditions, or process parameters set forth therein.

EXAMPLES

Example 1: Preparation of a Porous Material

A porous material was prepared by dissolving a hydroxy terminated polystyrene and poly(lactic acid) in tetrahydrofuran in a nitrogen-filled glove bag to a total polymer concentration of 30 wt %. The polystyrene had a weight average molecular weight of 11 kDa and the poly(lactic acid) had a weight average molecular weight of 10 kDa. The weight fraction of the poly(lactic acid) based on the total weight of the poly(lactic acid) and the polystyrene was 0.66. Tetraisocyanatosilane was then added to the polymer solution such that a mole ratio of NCO:OH in the solution was 1.4.

The tetrahydrofuran was then removed under nitrogen to result in a phase separated material. The phase separated material was then reswollen in tetrahydrofuran to remove any remaining unreacted polymer and then redried.

The phase separated material was then immersed in a 2 M (2 mol/L) solution of NaOH in a water/methanol mixture having a volume ratio of 6:4 for 4 days at room temperature (23° C.) to selectively etch poly(lactic acid) domains and form the porous material.

Example 2: Analysis of Extent of Removal of the Poly(Lactic Acid) Domains

Figure 2A:
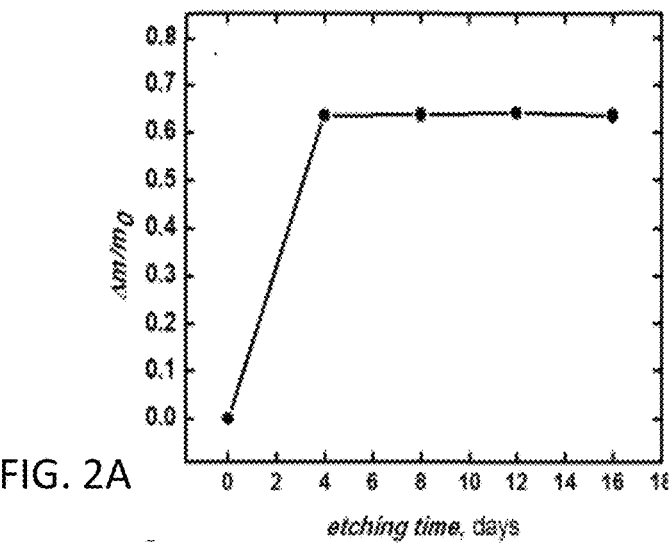
FIG. 2a is a graphical illustration of the gravimetric data of Example 2.
Figure 2B:
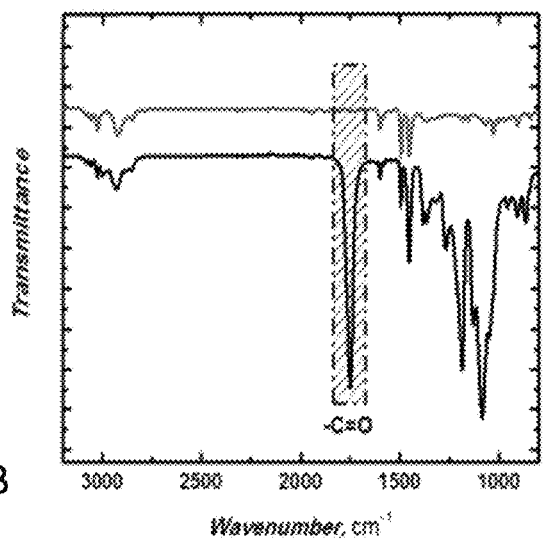
FIG. 2b is a graphical illustration of the Fourier transform infrared spectroscopy data of Example 2.
Figure 2C:
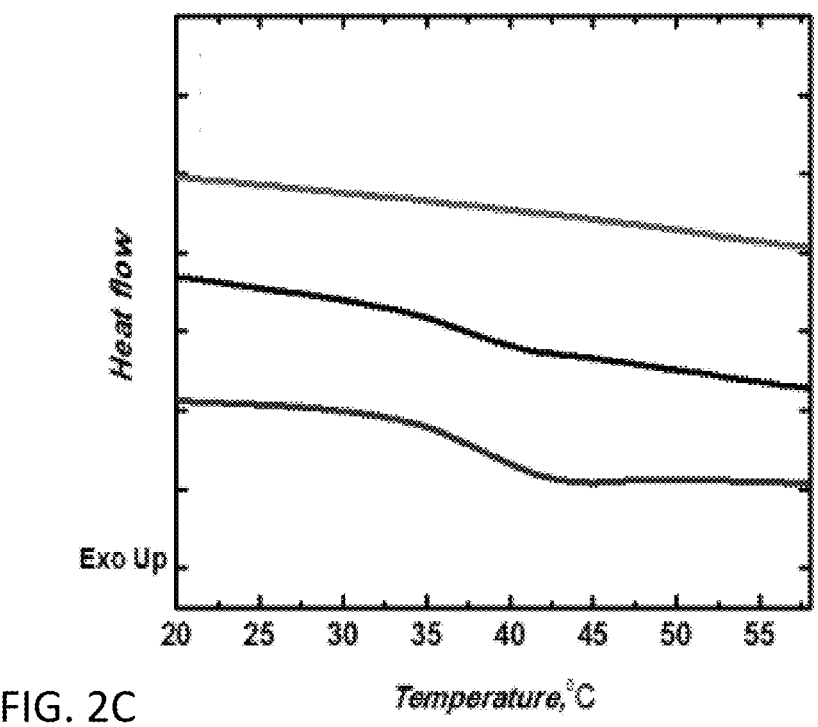
FIG. 2c is a graphical illustration of the differential scanning calorimetry data of Example 2.

The extent of removal of poly(lactic acid) domains of the porous material of Example 1 was studied by gravimetric analysis, Fourier transform infrared spectroscopy (FTIR), and differential scanning calorimetry (DSC), as shown in FIG. 2a-c, respectively. For the gravimetric analysis, the change in weight, $\Delta m$, divided by the initial weight, $m_0$, was monitored with time. FIG. 2a illustrates that after 4 days of etching, the weight of the sample reaches 0.64 and stops decreasing. This plateau in sample weight indicates that the poly(lactic acid) component is fully removed after 4 days.

FIG. 2b is a graphical illustration of the FTIR data obtained before etching, bottom data, and after etching, top data. FIG. 2b illustrates that there is a complete disappearance of the —C═O peak (1,750 inverse centimeters ($cm^{-1}$)) after etching for 4 days. FIG. 2c is a graphical illustration of the DSC data obtained before etching, middle data, after etching, top data, and of pure poly(DL-lactic acid). FIG. 2c further illustrates that the poly(lactic acid) component is fully removed after 4 days by the complete disappearance of the poly(lactic acid) glass transition (at 38° C.).

The complete removal of the PLA phase, along with the PS phase maintaining its structural integrity, clearly indicates that the phase separated material was a randomly end-linked network, bi-continuous with both phases percolating throughout the material.

Example 3: Analysis of the Domain Structure of the Porous Material

Figure 2D:
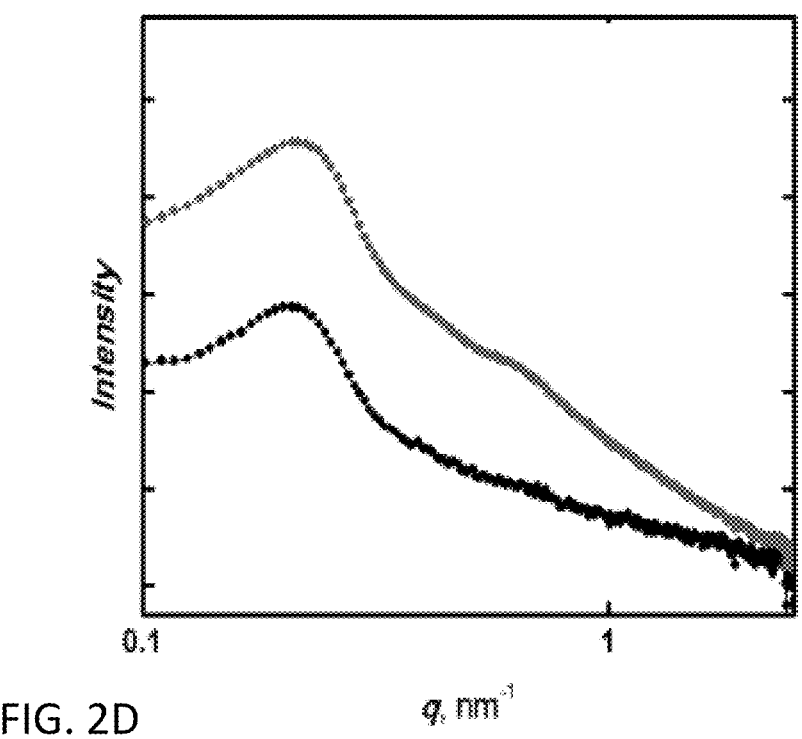
FIG. 2d is a graphical illustration of the small-angle X-ray scattering data of Example 3.

The structure of the network before etching, bottom data, and after etching, top data, of the porous material of Example 1 was then investigated by small-angle X-ray scattering (SAXS), where q is the scattering vector and $nm^{-1}$ refers to inverse nanometers. FIG. 2d shows that before etching (bottom data), the SAXS data shows a clear and broad scattering peak with a d-spacing of 30 nm, consistent with a disordered phase separated structure. After etching (top data), the SAXS data shows a scattering peak with the same shape and d-spacing, suggesting that the characteristic structure has not changed; however, the data further shows that the scattering intensity is increased. This increase in intensity is due to the greater contrast in electron density between the polystyrene and vacuum as compared to the contrast between the polystyrene and the poly(lactic acid) of the phase separated material. It is further noted that the increased contrast also makes it possible to detect a weak higher order peak at approximately 3q*.

Figure 3:
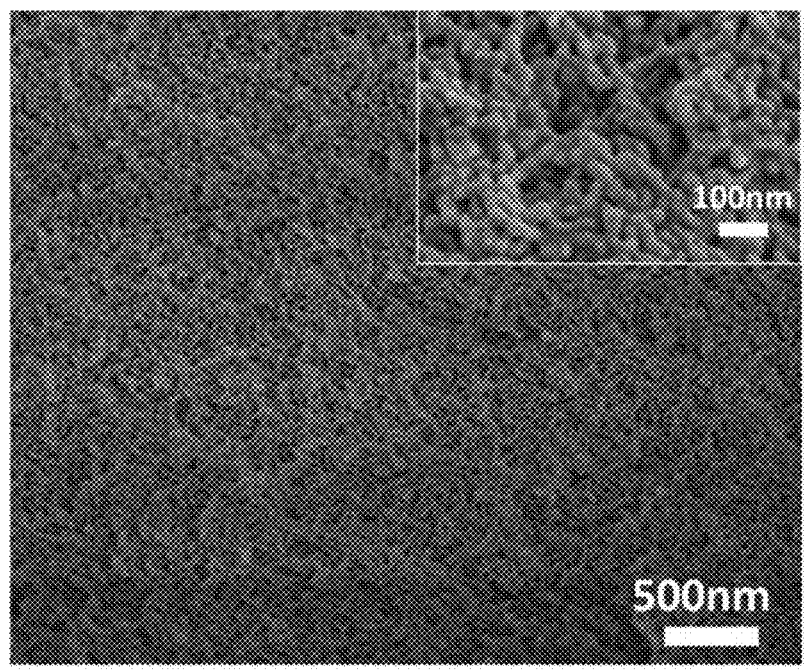
FIG. 3 is a scanning electron microscope image of the porous material of Example 3.

The morphology of the porous material was further characterized by scanning electron microscopy (SEM), as shown in FIG. 3. FIG. 3 shows that the PS phase is well percolated, but is penetrated by an interconnected network of pores. The structure is disordered and has a characteristic spacing of 30 to 40 nm, which is in agreement with the SAXS measurement.

Examples 4-14: Effect of Changing Volume Fraction of the Polymers

A series of samples were prepared according to the procedure of Example 1, except that the weight fraction of the poly(lactic acid) based on the total weight of the poly(lactic acid) and the polystyrene was varied from 0.3 to 0.9. Gravimetric analysis was performed on each sample and the final weight change divided by the initial weight, $\Delta m/m_0^f$, as determined by a plateau in the weight change was plotted versus the weight fraction of the poly(lactic acid). The results are shown in Table 1 and FIG. 4, where the PLA in wt % and vol % are the relative values of poly(lactic acid) to the polystyrene added during preparation, such that the amount of the poly(lactic acid) plus the amount of the polystyrene is equal to 100.

TABLE 1

| Example | PLA (wt %) | PLA (vol %) | $\Delta m/m_0^f$ | Pore structure |
| --- | --- | --- | --- | --- |
| 4 | 85 | 82.6 | — | PS did not percolate |
| 5 | 80 | 77.1 | — | PS did not percolate |
| 6 | 75 | 71.6 | 75.3 ± 0.1 | Bi-continuous structure |
| 7 | 70 | 66.2 | 68.7 ± 0.6 | Bi-continuous structure |
| 8 | 66 | 62 | 63.7 ± 0.3 | Bi-continuous structure |
| 9 | 61 | 56.8 | 60.1 ± 1.1 | Bi-continuous structure |
| 10 | 51 | 46.6 | 51.8 ± 0.6 | Bi-continuous structure |
| 11 | 46 | 41.7 | 48.2 ± 0.3 | Bi-continuous structure |
| 12 | 41 | 36.9 | 18.6 ± 2.1 | PLA did not percolate |
| 13 | 36 | 32.1 | 10.2 ± 1.7 | PLA did not percolate |
| 14 | 31 | 27.4 | 9.6 ± 1.9 | PLA did not percolate |

Figure 4:
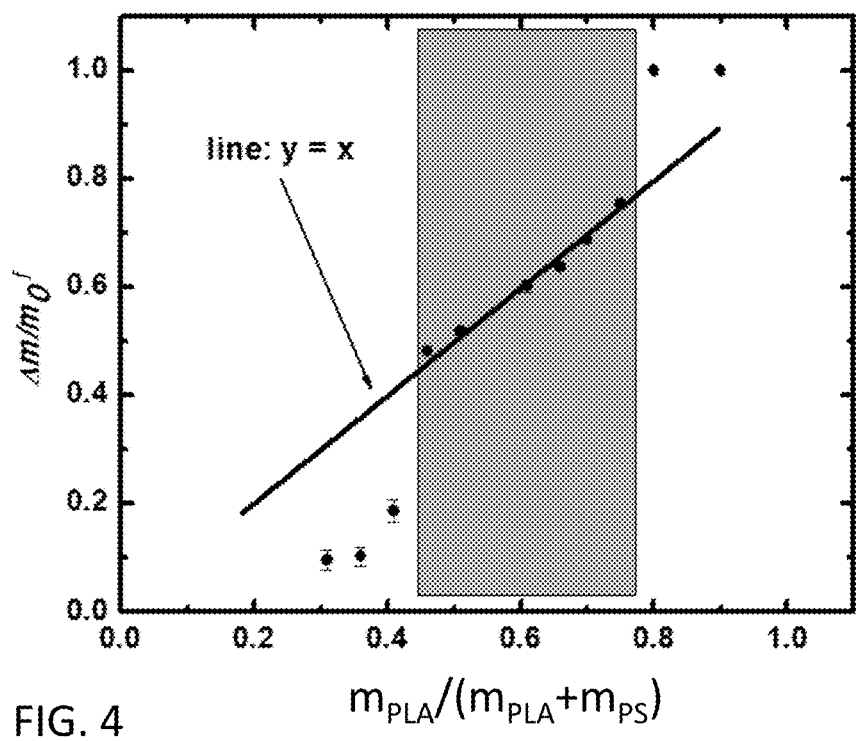
FIG. 4 is a graphical illustration of the gravimetric data of Example 4.

Table 1 and FIG. 4 show that for samples comprising 45 to 75 wt % poly(lactic acid), the points on a plot of $\Delta m/m_0$ against $w_{PLA}$ fall on the line of y=x. Without being bound by theory, it is believed that both phases of Examples 6-11 percolate through the whole material due to the complete accessibility of base to poly(lactic acid) phase and intact connection of polystyrene matrix. For Examples 12-14 that comprise a lower amount of poly(lactic acid), the data falls below the line of y=x and it is believed that the poly(lactic acid) phase is not completely percolated, presumably due to the inaccessibility of these domains by the basic etching solution. Conversely, for Examples 4 and 5 that comprise a higher amount of poly(lactic acid), the data falls above the line of y=x and it is believed that the polystyrene phase is not completely percolated as disconnected domains can be extracted from the sample during etching.

Examples 15-16: Effect of Varying Molecular Weight

Examples 15 and 16 were prepared in accordance with Example 1 except that for Example 15, the polystyrene had a weight average molecular weight of 6 kDa and the poly(lactic acid) had a weight average molecular weight of 5 kDa, and for Example 16 the polystyrene had a weight average molecular weight of 33 kDa and the poly(lactic acid) had a weight average molecular weight of 34 kDa. Small angle x-ray scattering was performed on the resultant porous materials of Examples 15 and 16 and were compared to that of Example 1. The SAXS data is shown in FIG. 5a and the domain spacing versus the sum of the number average molecular weights of the polystyrene and the poly (lactic acid) is shown in FIG. 5b.

Figure 5A:
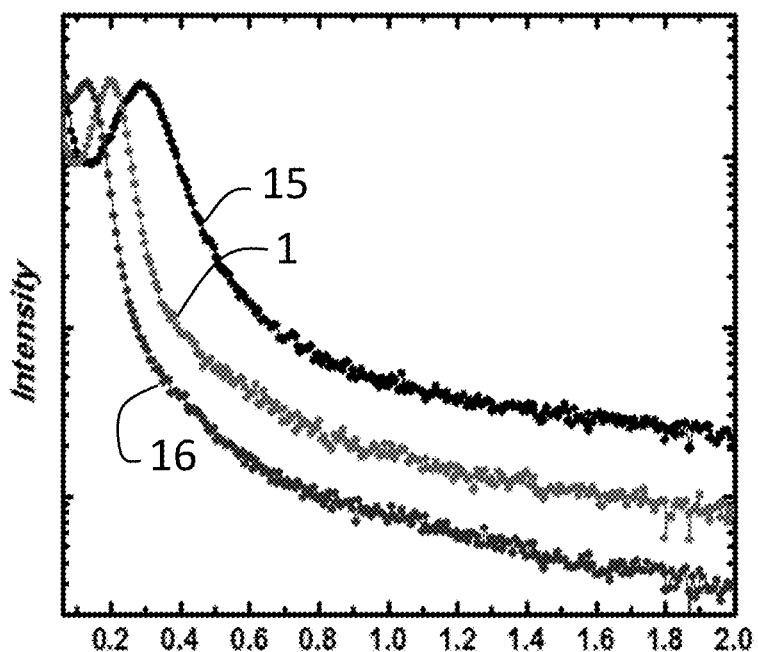
FIG. 5a is a graphical illustration of the small-angle X-ray scattering data of Examples 1, 15, and 16.
Figure 5B:
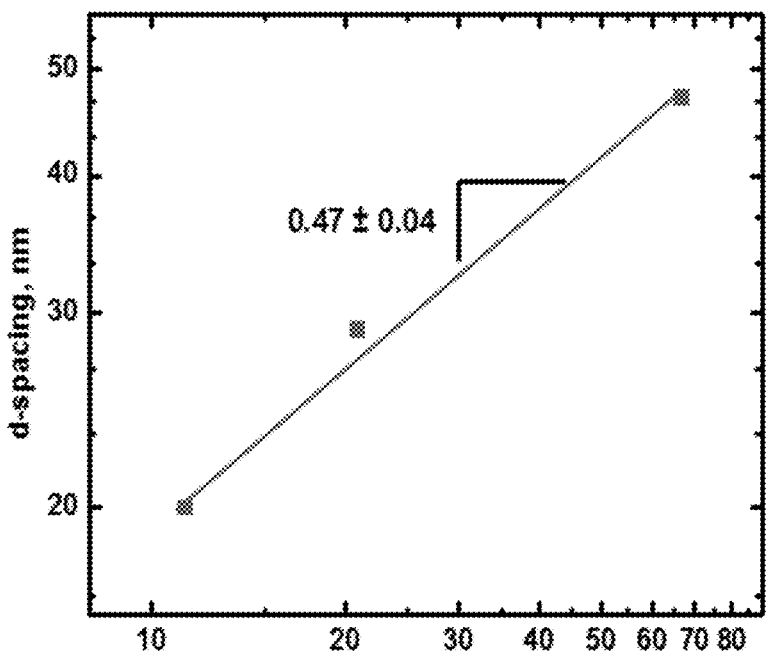
FIG. 5b is a graphical illustration of the domain spacing versus number average molecular weight of Examples 1, 15, and 16.

As seen in FIG. 5a, the SAXS data shows a clear scattering peak for each porous material, representing the characteristic size of the random bi-continuous morphology. FIG. 5b shows that the domains spacing (d=2π/q*) varies with $M_n$ according to $M_n^{0.5}$, which is consistent with prediction from de Gennes for randomly crosslinked networks. FIG. 5b indicates that as the $M_n^{0.5}$ is proportional to 1/q*, the pore structure of each of the porous materials is similar.

Example 17: Formation of an Anisotropic Porous Material

A porous material was prepared according to Example 1, except that after forming the phase separated material, the phase separated material was uniaxially stretched (ε=ΔL/L=1 to 1.5) at a temperature of 120° C. and then quenched to room temperature to preserve the oriented structure.

Figure 6A:
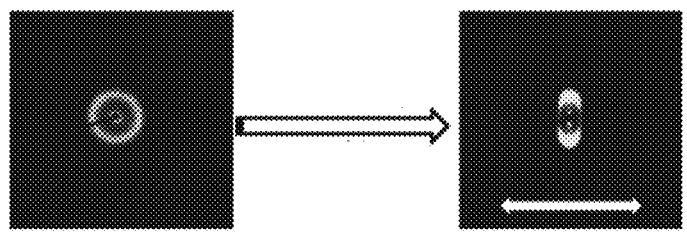
FIG. 6a is a graphical illustration of the SAXS data of Example 17.

The morphology before and after stretching was studied by SAXS measurements taken of the phase separated material before stretching (left-hand image) and of the porous material after stretching and etching (right-hand image, where the arrow indicates the stretching direction) and is shown in FIG. 6a. FIG. 6a shows that, before stretching, a scattering ring of uniform intensity was measured indicating that the phase separated material had an isotropic structure. After stretching, the SAXS data displays a scattering ring having strong scattering peaks in the perpendicular direction and weaker scattering peaks in the parallel direction, indicating an anisotropic morphology.

Figure 6B:
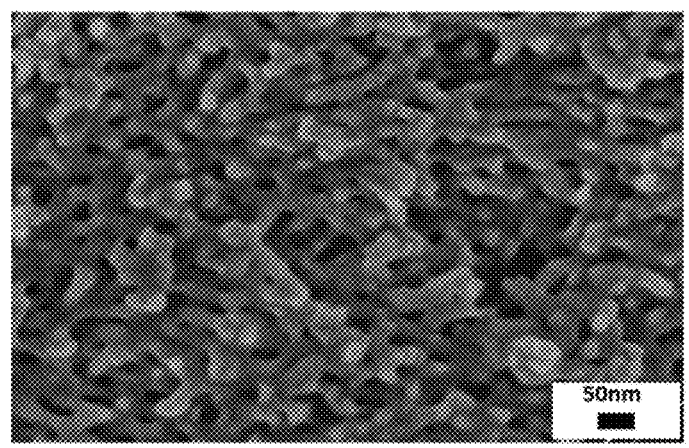
FIG. 6b is a scanning electron microscope image of the anisotropic porous material of Example 17.

Consistent with the observations from scattering, SEM imaging of the resulting anisotropic porous material as shown in FIG. 6b, where the arrow indicates the stretching direction, shows that the PS domains and pores are both aligned along the stretching direction, while still maintaining the percolated structure.

Figure 6C:
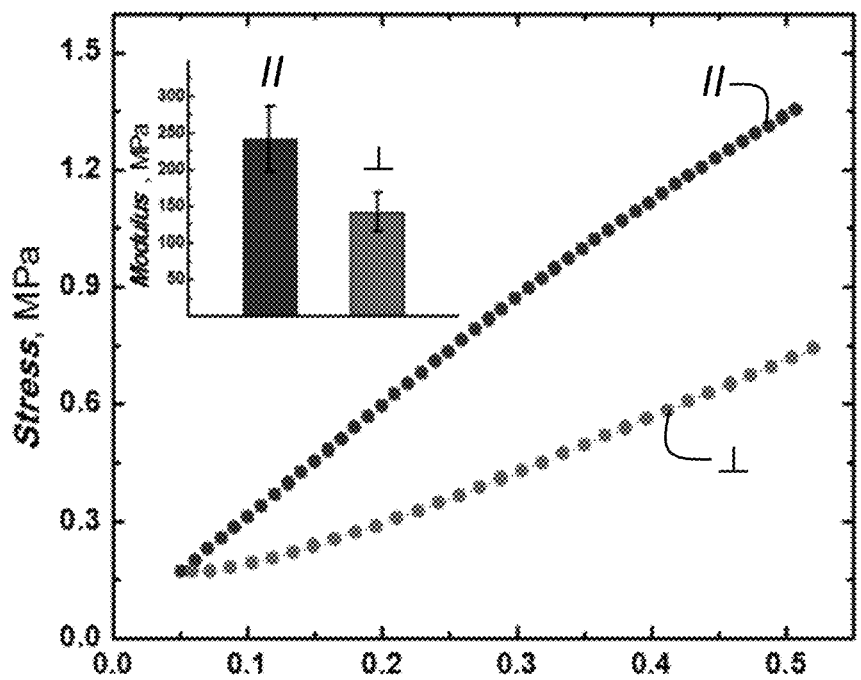
FIG. 6c is a graphical analysis of the anisotropic phase separated material of Example 17.

Mechanical testing was then performed on the phase separated material after stretching in both the parallel and the perpendicular directions to the stretching direction and are shown in FIG. 6c, where MPa refers to megapascal. FIG. 6c shows that the Young's modulus in the direction parallel to stretching (about 250 MPa) was significantly increased as compared to that in the perpendicular direction (about 150 MPa), which indicates that the anisotropic structure translates to an anisotropic mechanical response.

Set forth below are non-limiting embodiments of the present porous material, methods of making, and articles made therefrom.

Embodiment 1

A method of making a porous material, comprising: reacting an endgroup of a base polymer and an endgroup of a degradable polymer with a reactive group of a crosslinker in the presence of a solvent; removing the solvent to form a phase separated material; and removing the degradable polymer to form the porous material.

Embodiment 2

The method of Embodiment 1, wherein the crosslinker comprises greater than or equal to 3, or greater than or equal to 4, or 3 to 6, or 3 to 4 reactive groups.

Embodiment 3

The method of any one of the preceding embodiments, wherein the reactive group comprises a hydroxyl group, an isocyanate group, a primary amine group, a carboxyl group, a thiol group, a halide group, a silane group, an epoxy group, a halide group, a vinyl group, a norbornene group, an aldehyde group, an azide group, an alkyne group, an ester group, an acrylate group, a methacrylate group, or a combination comprising at least one of the foregoing, preferably, the reactive group comprises an isocyanate group.

Embodiment 4

The method of any one of the preceding embodiments, wherein the crosslinker comprises boric acid, pentaerythritol propoxylate, tetraisocyanatosilane, 1,3,5-triallyl-1,3,5-triazine, trimethylolpropane ethoxylate, glycerol ethoxylate, trivinyl benzene, trimellitic trichloride, tris-p-hydroxy phenyl ethane, pentaerythritol tetrakis(3-mercaptopropionate), or a combination comprising at least one of the foregoing, preferably, the crosslinker comprises tetraisocyanatosilane.

Embodiment 5

The method of any one of the preceding embodiments, wherein the endgroup of the base polymer and the endgroup of the degradable polymer each comprise one of a hydroxyl group and an isocyanate group and the reactive group comprises the other of the hydroxyl and the isocyanate group, and wherein a ratio of the isocyanate group to the hydroxyl group prior to the reacting is greater than 1, or 1.1 to 2, or 1.3 to 1.6.

Embodiment 6

A method of making a porous material, optionally, of any one of the preceding embodiments, comprising: reacting an endgroup of a base polymer with an endgroup of a degradable polymer in the presence of a solvent; removing the solvent to form a phase separated material; and removing the degradable polymer to form the porous material.

Embodiment 7

The method of Embodiment 6, wherein one of the endgroup of the base polymer and the endgroup of the degradable polymer comprises a hydroxyl group and the other comprises an isocyanate group, and wherein a ratio of the isocyanate group to the hydroxyl group prior to the reacting is greater than 1, or 1.1 to 2, or 1.3 to 1.6.

Embodiment 8

The method of any one of the preceding embodiments, wherein the base polymer comprises a polyolefin, a polyester, a polyamide, a polyimide, a polycarbonate, a polysulfone, a polysiloxane, a polysulfone, poly(phenylene oxide), a polyacetal, a polyacrylamide, a polyarylene ether, a polybenzothiazole, a polybenzoxazole, a polybenzimidazole, a polyurea, a polyurethane, a vinyl polymer, a polyacrylate, a polyether, or a combination comprising at least one of the foregoing.

Embodiment 9

The method of any one of the preceding embodiments, wherein the base polymer comprises polyacrylonitrile, polybutadiene, polystyrene, poly(ether ether ketone), poly(ether ketone), poly(methyl methacrylate), polypropylene, polybutylene, polyethylene, polytetrafluoroethylene, polyvinylidene fluoride, polyvinylchloride, poly(ethylene oxide), poly(acrylic acid), poly(methacrylic acid), poly(ethylene glycol), poly(vinyl alcohol), or a combination comprising at least one of the foregoing.

Embodiment 10

The method of any one of the preceding embodiments, wherein the porous material has a continuous pore structure.

Embodiment 11

The method of Embodiment 10, wherein an average width of the continuous pore structure is 5 to 200 nm.

Embodiment 12

The method of any one of the preceding embodiments, wherein the base polymer and the degradable polymer have a Flory-Huggins parameter of 0.05 to 0.5, or 0.2 to 0.4 at 20° C.

Embodiment 13

The method of any one of the preceding embodiments, wherein a weight average molecular weight ratio of the base polymer to the degradable polymer prior to the reacting is 1:2 to 2:1, or 1:1.5 to 1.5:1, or 1:1.1 to 1.1:1.

Embodiment 14

The method of any one of the preceding embodiments, wherein the phase separated material comprises 40 to 75 wt % of the degradable polymer based on the total weight of the base polymer and the degradable polymer.

Embodiment 15

The method of any one of the preceding embodiments, wherein the endgroup of the base polymer and the endgroup of the degradable polymer each independently comprise a hydroxyl group, an isocyanate group, a primary amine group, a carboxyl group, a thiol group, a halide group, a silane group, an epoxy group, a halide group, a vinyl group, a norbornene group, an aldehyde group, an azide group, an alkyne group, an ester group, an acrylate group, a methacrylate group, or a combination comprising at least one of the foregoing.

Embodiment 16

The method of any one of the preceding embodiments, wherein the endgroup of the base polymer and the endgroup of the degradable polymer each comprise the same endgroup, preferably, a hydroxyl group.

Embodiment 17

The method of any one of the preceding embodiments, wherein the degradable polymer prior to the reacting comprises poly(lactic acid) and preferably has the formula

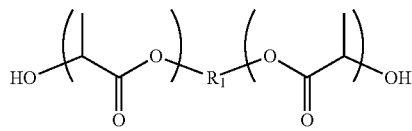

wherein $R_1$ is derived from a difunctional initiator used during polymerization or a linking group used to link a first poly(lactic acid) prepolymer and a second poly(lactic acid) prepolymer.

Embodiment 18

The method of any one of the preceding embodiments, wherein the base polymer prior to the reacting comprises polystyrene and preferably has the formula

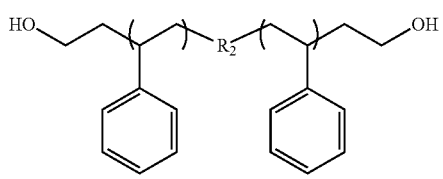

wherein $R_2$ is derived from a difunctional initiator used during polymerization or a linking group used to link a first polystyrene prepolymer and a second polystyrene prepolymer.

Embodiment 19

The method of any one of the preceding embodiments, wherein the solvent comprises tetrahydrofuran, chloroform, dioxane, diethyl ether, diaryl ether, 2-butanone, 2-pentanone, hexanone, 2-heptanone, 2-octanone, propyl ether, butyl ether, furan, ethyl acetate, propyl acetate, butyl acetate, dimethyl acetamide, dimethyl formamide, or a combination comprising at least one of the foregoing.

Embodiment 20

The method of any one of the preceding embodiments, wherein the removing the solvent comprises heating.

Embodiment 21

The method of any one of the preceding embodiments, wherein the removing the solvent comprises drying in an inert environment, preferably, under nitrogen.

Embodiment 22

The method of any one of the preceding embodiments, further comprising, after the removing the solvent, swelling the phase separated material to form a swollen phase separated material and drying the swollen phase separated material.

Embodiment 23

The method of any one of the preceding embodiments, wherein the removing the degradable polymer comprises introducing a degradation agent to the phase separated material.

Embodiment 24

The method of Embodiment 23, wherein the degradation agent comprises a solvent, a microorganism, light, or a combination comprising at least one of the foregoing.

Embodiment 25

The method of Embodiment 24, wherein the solvent comprises water, an acid, a base, an alcohol, or a combination comprising at least one of the foregoing.

Embodiment 26

The method of any one of the preceding embodiments, wherein the removing the degradable polymer comprises degrading by heating the phase separated material.

Embodiment 27

The method of any one of the preceding embodiments, wherein one or both of the crosslinker and the degradable polymer comprises a photodegradable segment and the removing the degradable polymer comprises introducing a light to the phase separated material.

Embodiment 28

The method of any one of the preceding embodiments, wherein removing the degradable polymer comprises degrading a linking group linking the base polymer to the degradable polymer and dissolving the degradable polymer.

Embodiment 29

The method of any one of the preceding embodiments, further comprising stretching the phase separated material at an elevated temperature that is above a highest glass transition temperature of both of the base polymer and the degradable polymer, and then reducing the elevated temperature to a reduced temperature that is below a lowest glass transition temperature of both of the base polymer and the degradable polymer.

Embodiment 30

The method of Embodiment 29, wherein the stretching comprises uniaxially stretching, preferably, to a strain of greater than 1, or 1.1 to 5, or 1.1 to 1.5.

Embodiment 31

The method of any one of the preceding embodiments, wherein, prior to the reacting, the degradable polymer and the base polymer each independently have a weight average molecular weight of 2 to 100 kDa, or 4 to 50 kDa based on polystyrene standards.

Embodiment 32

The method of any one of the preceding embodiments, wherein the porous material comprises greater than or equal to 95 wt %, or 99 to 100 wt % of the base polymer that was present in the phase separated material.

Embodiment 33

The method of any one of the preceding embodiments, wherein the degradable polymer comprises a polyester, a polyamide, a polyether, a polyanhydride, a polycarbonate, a polyurethane, or a combination comprising at least one of the foregoing.

Embodiment 34

The method of any one of the preceding embodiments, wherein the degradable polymer is derived from glycolide, ε-caprolactone, δ-valerolactone, ε-caprolactam, δ-valerolactam, trimethylene carbonate, tetramethylene carbonate, 1,5-dioxepane-2-one, 1,4-dioxane-2-one (para-dioxanone), a cyclic anhydrides (such as oxepane-2,7-dione), or a combination comprising at least one of the foregoing.

Embodiment 35

The method of any one of the preceding embodiments, wherein the degradable polymer comprises poly(lactic acid), poly(glycolic acid), polyhydroxybutyrate, a polysaccharide, poly-ε-caprolactone, poly-ε-caprolactam, polybutylene succinate, polybutylene succinate adipate, polyethylene succinate adipate, or a combination comprising at least one of the foregoing.

Embodiment 36

A porous material made from any one of the preceding embodiments comprising: the base polymer having a continuous pore structure.

Embodiment 37

The porous material of Embodiment 36, wherein greater than or equal to 90 vol %, or 95 to 100 vol % of the continuous pore structure is interconnected based on a total volume of the pore structure.

Embodiment 38

The porous material of any one of Embodiments 36-37, wherein the porous material is anisotropic, preferably, having a first elastic modulus in a first direction that is greater than a second elastic modulus in a second direction perpendicular to the first direction.

Embodiment 39

An article comprising the porous material of any one of the foregoing embodiments.

Embodiment 40

The article of Embodiment 39, wherein the article is a filter.

Embodiment 41

A catalyst comprising the porous material of any one of Embodiments 1-39.

Embodiment 42

A wind turbine comprising the porous material of any one of Embodiments 1-39.

Embodiment 43

Use of the porous material of any one of Embodiments 1-39 in a wind turbine, a catalyst, or a filter.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

In general, the disclosure can alternately comprise, consist of, or consist essentially of, any appropriate components herein disclosed. The disclosure can additionally, or alternatively, be formulated so as to be devoid, or substantially free, of any components, materials, ingredients, adjuvants or species used in the prior art compositions or that are otherwise not necessary to the achievement of the function/objectives of the disclosure.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. The endpoints of all ranges directed to the same component or property are inclusive of the endpoints, are independently combinable, and include all intermediate points. For example, ranges of "up to 25 wt %, or more specifically 5 to 20 wt %" is inclusive of the endpoints and all intermediate values of the ranges of "5 to 25 wt %," such as 10 to 23 wt %. The term "combination" is inclusive of blends, mixtures, alloys, reaction products, and the like. "Optional" or "optionally" means that the subsequently described event or circumstance may or may not occur, and that the description includes instances where the event occurs and instances where it does not. The terms "first," "second," and the like, as used herein do not denote any order, quantity, or importance, but rather are used to distinguish one element from another. Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making a porous material, comprising:
   reacting, in the presence of a solvent, an endgroup of a base polymer with an endgroup of a degradable polymer and/or reacting the endgroup of the base polymer and the endgroup of the degradable polymer with a reactive group of a crosslinker; wherein the crosslinker is present during the reacting and wherein the crosslinker comprises greater than or equal to 3 reactive groups;
   removing the solvent to form a phase separated material; and
   removing the degradable polymer to form the porous material.

2. The method of claim 1, wherein the endgroup of the base polymer, the endgroup of the degradable polymer, and the reactive group, if present, each independently comprise a hydroxyl group, an isocyanate group, a primary amine group, a carboxyl group, a thiol group, a halide group, a silane group, an epoxy group, a vinyl group, a norbornene group, an aldehyde group, an azide group, an alkyne group, an ester group, an acrylate group, a methacrylate group, or a combination comprising at least one of the foregoing.

3. The method of claim 1, wherein the endgroup of the base polymer and the endgroup of the degradable polymer each comprise one of a hydroxyl group and an isocyanate group and the reactive group comprises the other of the hydroxyl and the isocyanate group, and wherein a ratio of the isocyanate group to the hydroxyl group prior to the reacting is greater than 1, and/or
   wherein one of the endgroup of the base polymer and the endgroup of the degradable polymer comprises a hydroxyl group and the other comprises an isocyanate group, and wherein a ratio of the isocyanate group to the hydroxyl group prior to the reacting is greater than 1.

4. The method of claim 1, wherein the base polymer comprises a polyolefin, a polyester, a polyamide, a polyimide, a polycarbonate, a polysulfone, a polysiloxane, a polysulfone, a poly(phenylene oxide), a polyacetal, a polyacrylamide, a polyarylene ether, a polybenzothiazole, a polybenzoxazole, a polybenzimidazole, a polyurea, a polyurethane, a vinyl polymer, a polyacrylate, a polyether, or a combination comprising at least one of the foregoing.

5. A method of making a porous material, comprising:
   reacting, in the presence of a solvent, an endgroup of a base polymer with an endgroup of a degradable polymer and/or reacting the endgroup of the base polymer and the endgroup of the degradable polymer with a reactive group of a crosslinker;

removing the solvent to form a phase separated material; and removing the degradable polymer to form the porous material;

wherein at least one of a weight average molecular weight ratio of the base polymer to the degradable polymer prior to the reacting is 1:2 to 2:1, or wherein the phase separated material comprises 40 to 75 wt % of the degradable polymer based on the total weight of the base polymer and the degradable polymer.

6. The method of claim 5, wherein the phase separated material comprises 40 to 75 wt % of the degradable polymer based on the total weight of the base polymer and the degradable polymer.

7. A method of making a porous material, comprising:

reacting, in the presence of a solvent, an endgroup of a base polymer with an endgroup of a degradable polymer and/or reacting the endgroup of the base polymer and the endgroup of the degradable polymer with a reactive group of a crosslinker;

removing the solvent to form a phase separated material; and removing the degradable polymer to form the porous material;

wherein at least one of the degradable polymer prior to the reacting comprises poly(lactic acid) and has a formula

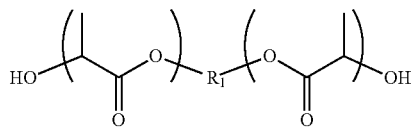

wherein $R_1$ is derived from a difunctional initiator used during polymerization or a linking group used to link a first poly(lactic acid) prepolymer and a second poly(lactic acid) prepolymer or the base polymer prior to the reacting comprises polystyrene and has a formula

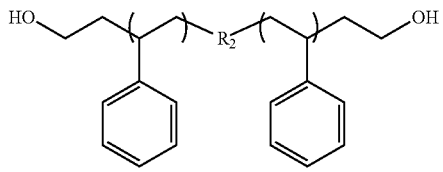

wherein $R_2$ is derived from a difunctional initiator used during polymerization or a linking group used to link a first polystyrene prepolymer and a second polystyrene prepolymer.

8. The method of claim 7, wherein the base polymer prior to the reacting comprises polystyrene and has the formula

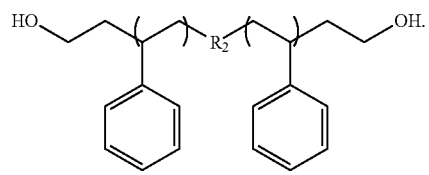

9. The method of claim 1, wherein the solvent comprises tetrahydrofuran, chloroform, dioxane, diethyl ether, diaryl ether, 2-butanone, 2-pentanone, hexanone, 2-heptanone, 2-octanone, propyl ether, butyl ether, furan, ethyl acetate, propyl acetate, butyl acetate, dimethyl acetamide, dimethyl formamide, or a combination comprising at least one of the foregoing.

10. The method of claim 1, wherein the removing the degradable polymer comprises heating, introducing a degradation agent to the phase separated material, introducing ultraviolet light, degrading a linking group linking the base polymer to the degradable polymer, or a combination comprising at least one of the foregoing.

11. The method of claim 1, further comprising stretching the phase separated material at an elevated temperature that is above a highest glass transition temperature of both of the base polymer and the degradable polymer, and then reducing the elevated temperature to a reduced temperature that is below a lowest glass transition temperature of both of the base polymer and the degradable polymer.

12. The method of claim 1, wherein, prior to the reacting, the degradable polymer and the base polymer each independently have a weight average molecular weight of 2 to 100 kDa based on polystyrene standards.

13. The method of claim 1, wherein the porous material comprises greater than or equal to 95 wt % of the base polymer that was present in the phase separated material.

14. The method of claim 1, wherein the degradable polymer comprises a polyester, a polyamide, a polyether, a polyanhydride, a polycarbonate, a polyurethane, a poly(lactic acid), a poly(glycolic acid), a polyhydroxybutyrate, a polysaccharide, or a combination comprising at least one of the foregoing.

15. The method of claim 5, wherein the weight average molecular weight ratio of the base polymer to the degradable polymer prior to the reacting is 1:2 to 2:1.

16. The method of claim 7, wherein the degradable polymer prior to the reacting comprises poly(lactic acid) and has the formula

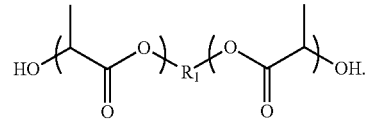

* * * * *